United States Patent
McJones

[15] 3,640,337
[45] Feb. 8, 1972

[54] USE OF THE HEAT OF VAPORIZATION OF A FUEL AS AN AIR-CONDITIONING MEDIUM FOR A VEHICLE

[72] Inventor: Robert W. McJones, 529 Via Del Monte, Palos Verdes Estates, Calif. 90274

[22] Filed: Mar. 13, 1970

[21] Appl. No.: 19,279

[52] U.S. Cl................................................165/23, 165/43
[51] Int. Cl............................................................B60h 3/04
[58] Field of Search.......................165/22, 23, 27, 42, 43, 44

[56] References Cited

UNITED STATES PATENTS 2,028,069   1/1936   Horton ....................................165/43
2,751,155   6/1956   Collat......................................165/22

Primary Examiner—Charles Sukalo
Attorney—Christie, Parker & Hale

[57] ABSTRACT

The energy required to vaporize a liquid fuel, such as liquid natural gas, of a vehicle is used to cool water in a loop. The cooled water is passed through a heat exchanger for heat exchange with air to cool the latter to effect air conditioning. A thermostatically controlled valve admits engine-cooling water to the loop when there is a danger of freezing of the water in the loop. The loop is also used when it is desired to heat the vehicle. During heating, engine-cooling water is admitted to the heat exchanger, passes through the loop to perform its vaporizing function, and then goes out a recirculating line for return to the radiator.

6 Claims, 1 Drawing Figure

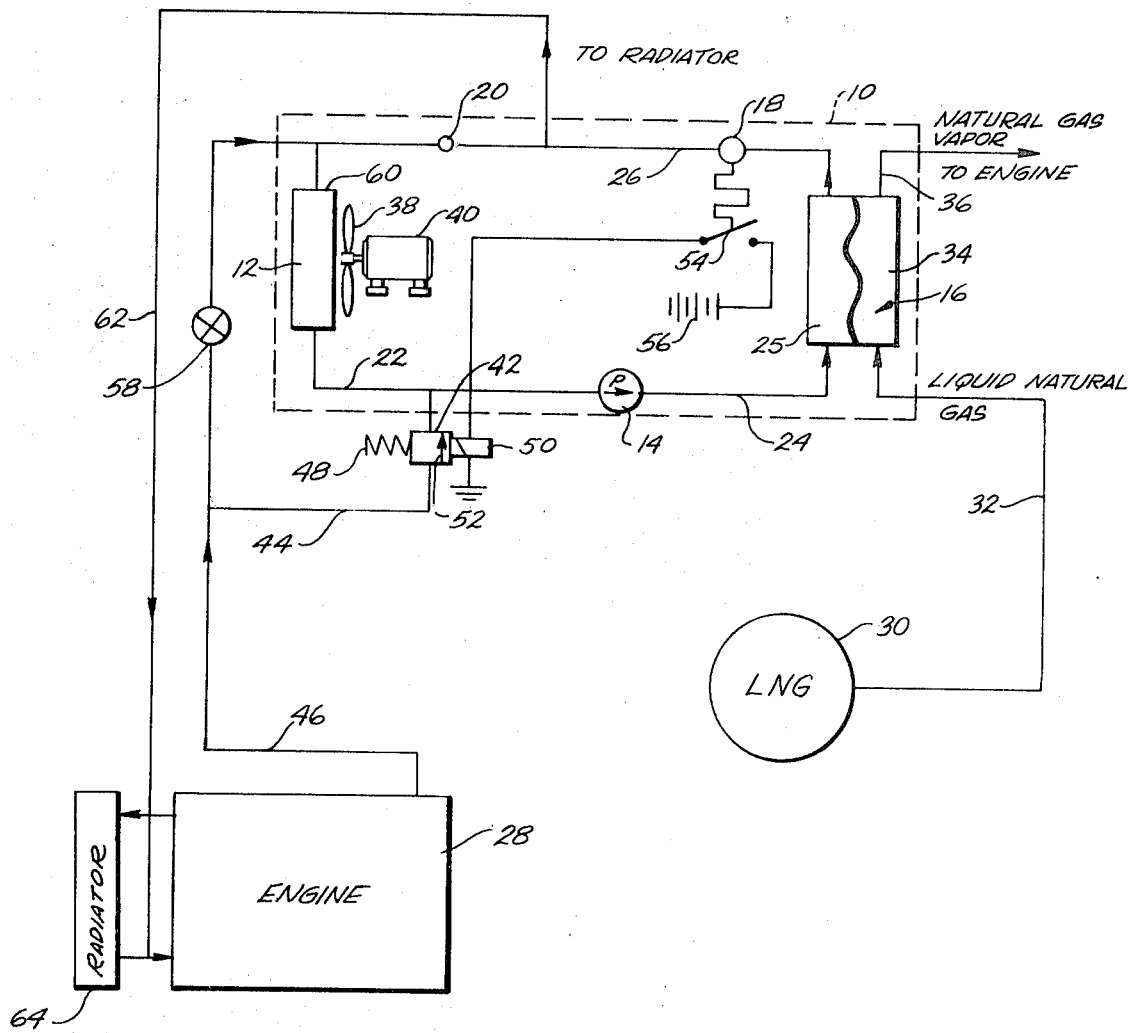

3,640,337

USE OF THE HEAT OF VAPORIZATION OF A FUEL AS AN AIR-CONDITIONING MEDIUM FOR A VEHICLE

BACKGROUND OF THE INVENTION

The present invention relates to air conditioning and heating of the passenger compartment of vehicles in general and, more in particular, to the use of heat energy extracted during the vaporization of fuel to air-condition the compartment when desired, and, when heating is desired, to use the engine-cooling water to vaporize the fuel and to heat the vehicle.

For some years liquid petroleum gas has been used as an alternate fuel for the internal combustion engine of a vehicle. Recently natural gas has become an alternate fuel to gasoline primarily because the exhaust gas emissions from a natural gas powered vehicle are very low in the pollutants of oxides of nitrogen, hydrocarbons and carbon monoxide. One of the ways of storing natural gas in a vehicle is to contain it in liquid form in a cryogenic container.

Liquefied natural gas must be vaporized before it is used as a fuel. Similarly, liquefied petroleum gas must be vaporized. The vaporization of these fuels requires heat energy. This fact has been used in the past, at least for liquefied petroleum gas, to provide cooling of the passenger compartment of a vehicle.

SUMMARY OF THE INVENTION

The present invention provides an improved system for cooling the passenger compartment of a vehicle wherein the working fluid employed in an engine's cooling fluid usually is water with or without antifreeze. The system also vaporizes the vehicle's fuel. In preferred form, the present invention also provides means to prevent the working fluid from freezing and means to heat the passenger compartment through the use of the same fluid used to vaporize the fuel.

In one form, the present invention contemplates a closed-loop heat exchange system including a vaporizer for vaporizing the vehicle's fuel and a heat exchanger for cooling passenger compartment air. The loop employs engine-cooling water as its working fluid. A thermostatic element is preferably provided to sense the temperature of the water of the loop as it leaves the vaporizer. In this preferred form, a valve controlled by the thermostatic element is disposed to admit radiator water from the vehicle's engine to the loop in the event that the temperature of the water in the loop lowers to a predetermined value of, say, 35° F. Means are also provided for storing the engine fuel, such as a cryogenic tank if the engine fuel is liquid natural gas. A pump in the loop is provided to circulate the working fluid.

A specific form of the present invention contemplates the use of the vehicle's passenger compartment heater as the heat exchanger in the loop. A heater valve is disposed to admit engine-cooling water from the engine to the heat exchanger when it is desired to heat the passenger compartment. A check valve is provided to prevent water being admitted to the loop from the engine from bypassing the heat exchanger by passing through recirculating line means from the loop to the engine's radiator, the recirculating line means being provided to recirculate engine-cooling water to the engine when the loop is receiving water from the engine.

The present invention provides a vehicle-cooling system which serves the function of cooling the vehicle while vaporizing a fuel such as liquid natural gas used with the vehicle's engine. The thermostat and its controlled valve prevent the working fluid used to vaporize or volatilize the fuel and to cool the passenger compartment of a vehicle from freezing. In its more particular form the present invention provides a simple and expedient means of coupling the cooling and vaporizing function with a vehicle's heater. In the latter instance the volatilizing requirement is still effected even though the system is heating the passenger compartment.

These and other features, aspects and advantages of the present invention will become more apparent from the following description, appended claims and drawing.

BRIEF DESCRIPTION OF THE FIGURE

The single FIGURE is a schematic diagram of the cooling and heating system of the present invention.

DESCRIPTION OF THE PREFERRED EMBODIMENT

With reference to the FIGURE, a system is shown for vaporizing the fuel used to power a vehicle and to either cool or heat the passenger compartment of the vehicle.

The system includes a working fluid loop 10 consisting in general of a heat exchanger 12, a pump 14, a vaporizer 16, a thermostatic element 18 and a check valve 20.

In greater detail, a line 22 of loop 10 leads from the outlet side of heat exchanger 12 to pump 14. The outlet of the pump is connected to a line 24 which leads to an inlet to a working fluid side 25 of vaporizer 16. An outlet line 26 leads from the working fluid side of vaporizer 16 and contains thermostatic element 18 and check valve 20. Loop 10 normally employs as a working fluid engine-cooling water with or without normal additives such as antifreeze.

The fuel illustrated for powering an engine 28 of the vehicle is liquid natural gas. The fuel is contained in the cryogenic vessel 30. A line 32 leads from this vessel to a fuel side 34 of vaporizer 16. An outlet line 36 leads from the fuel side of the vaporizer to a fuel-air mixer of engine 28.

Vaporizer 16 is of standard construction and functions to vaporize the liquid natural gas by heat exchange with engine-cooling water in loop 10. The engine-cooling water in loop 10 is cooled by the exchange of heat energy with the vaporizing fuel. The cooling is considerable inasmuch as there is a relatively large amount of energy required to change the state of the liquid natural gas from liquid to vapor.

Heat exchanger 12 is preferably a standard vehicle passenger compartment heater which may take the form of a radiator. A fan 38 is used to circulate air through the heat exchanger to cool passenger compartment air or, alternatively, to heat it. Fan 38 is driven by a motor 40 which gets its power from the vehicle's electrical system.

Thermostatic element 18 controls a solenoid valve 42. The solenoid valve is in fluid circuit through a line 44 with loop 10 and the cooling water passages of engine 28, the latter circuit being completed through a line 46 emanating from the cooling passages of the engine.

Solenoid valve 42 is normally closed. A spring 48 maintains the valve closed until a solenoid 50 is energized. Upon the energization of the solenoid, a valving element 52 of the solenoid valve is shifted to open the valve. Solenoid 50 is in series electrical circuit with a thermostatically controlled, normally open switch 54. Normally open switch 54 is in turn in series circuit with a source of power such as a vehicle battery 56. Normally open switch 54 is controlled by thermostatic element 18.

The thermostatic element is set to close normally open switch 54 when the temperature of the engine-cooling water in loop 10 leaving vaporizer 16 is about, say, 35° F., that is, when the temperature of the water leaving the vaporizer approaches its freezing point. Pump 14 is preferably powered by an electric motor, not shown. The motor can readily be run by the vehicle's electrical system.

A heater valve 58 is disposed in line 46. Line 46 is connected in fluid circuit with line 26 of loop 10 between an inlet 60 of heat exchanger 12 and check valve 20. A recirculating line 62 is disposed between thermostatic element 18 and check valve 20, and leads to the engine's cooling system, as between the outlet of a radiator 64 of the engine and the engine itself.

Check valve 20 is disposed to admit to fluid circulation around loop 10 only in a counterclockwise direction. As such, engine-cooling water admitted to the loop through heater valve 58 is forced through heat exchanger 12, rather than into line 26 and out recirculating line 62.

The operation of the system will initially be described for cooling of a passenger compartment of a vehicle. For cooling of the passenger compartment, heater valve 58 is closed. Under normal conditions solenoid valve 42 is also closed, pump 14 is energized and engine 28 is running. Liquid natural gas will pass from vessel 30 into vaporizer 16 where it is vaporized. The vaporized gas leaves vaporizer 16 to power the engine. During vaporization, engine-cooling water in loop 10 will be cooled. This water will continuously circulate around the loop for passage into and out of heat exchanger 12 and vaporizer 16, and is not circulated through the engine's cooling system. During its passage through heat exchanger 12 the water passes in heat exchange relationship with air being driven through the heat exchanger by fan 38. This air is cooled and is used in the passenger compartment of the vehicle. The relatively warm water leaving the heat exchanger enters the vaporizer where it is once again cooled. Pump 14 effects the circulation of engine-cooling water in loop 10.

In the event that the temperature of the engine-cooling water in loop 10 approaches its freezing temperature as it leaves vaporizer 16, say the water approaches 35° F., thermostatic element 18 will close normally open switch 54. With switch 54 closed, a circuit to solenoid 50 of solenoid valve 42 is established. With this circuit established, the solenoid valve opens momentarily to admit relatively warmer engine-cooling water from engine 28 to loop 10. While solenoid valve 42 is open to admit this relatively warmer water to the loop, water can leave the loop through recirculating line 62. The water leaving the loop is passed into the cooling system of engine 28 as at the outlet of radiator 64.

Under normal circumstances very little water will be admitted through solenoid valve 42 into loop 10 because very little water is needed to raise the temperature of the fluid in the loop to above the temperature required to actuate thermostatic element 18.

In the event that it is desired to provide heat within the passenger compartment of the vehicle, heater valve 58 is opened. With the opening of heater valve 58, heated engine-cooling water from engine 28 passes through line 46 into heat exchanger 12, check valve 20 preventing this water from entering line 26 and returning to the engine through line 62. This water passes in heat exchange relationship with air forced through the heat exchanger fan 38 to heat the air and the passenger compartment. The water leaving the heat exchanger will pass under the influence of pump 14 into vaporizer 16 where it will be cooled while supplying the heat required to vaporize fuel from vessel 30. The relatively cool water leaving the vaporizer will then pass through recirculating line 62 back to the radiator.

The system of the present invention provides a very simple and effective means for vaporizing an engine's fuel while serving a passenger compartment heating or cooling function. Through the use of a thermostatic element at the outlet of the system's vaporizer to control the admission of warm engine-cooling water to the working loop of the system, there is no risk that the working fluid will freeze. As a consequence, the function of the vaporizer is always assured and reliable air conditioning effected. Moreover, switching from air conditioning to heating is very simply accomplished with the use of a single valve. Thus, extensive and complicated system elements are avoided.

The present invention has been described with reference to a certain preferred embodiment. The spirit and scope of the appended claims should not necessarily, however, be limited to the foregoing description.

What is claimed is:

1. A fluid circuit for vaporizing a fuel for a water-cooled engine of a vehicle while cooling or heating a passenger compartment of the vehicle comprising:
   a. means for storing a source of fuel to be vaporized;
   b. a vaporizer for vaporizing fuel through heat exchange with a working fluid of engine-cooling water, the vaporizer being in fluid circuit with the fuel-storing means;
   c. a selectively closed fluid loop circuit for the working fluid;
   d. a heat exchanger in the loop for exchanging heat energy between the working fluid and air, the heat exchanger being adapted for discharge of such air into the passenger compartment of the vehicle and being in fluid circuit with the vaporizer;
   e. a pump in the loop in fluid circuit with the vaporizer and the heat exchanger for circulating working fluid around the loop;
   f. selectively actuatable, normally closed valve means for admitting warm engine-cooling water from the engine to the loop;
   g. means for recirculating engine-cooling water from the loop to the engine's cooling system when the valve means is open and after water entering the loop from the engine's cooling system passes through the heat exchanger and the vaporizer;
   h. thermostatic element means for sensing the temperature of the working fluid in the loop;
   i. second selectively actuatable, normally closed valve means for admitting warm engine-cooling water from the engine to the loop; and
   j. means coupling the thermostatic element means with the second valve means to open the valve means to admit warm engine-cooling water into the loop upon the sensing of a predetermined working fluid temperature near its freezing point by the thermostatic element, the recirculating means being operable to pass engine-cooling water from the loop when the second valve means is open.

2. The circuit claimed in claim 1 wherein the second valve means is disposed in fluid circuit with the loop between the working fluid inlet of the vaporizer and the outlet of the heat exchanger.

3. The circuit claimed in claim 2 wherein the first valve means is disposed in fluid circuit with the loop between the inlet of the heat exchanger and the working fluid outlet of the vaporizer.

4. The circuit claimed in claim 3 including check valve means between the recirculating means and the first valve means to prevent water from such valve means from bypassing the heat exchanger.

5. A system for vaporizing a fuel such as liquid natural gas used to power an engine of a vehicle while providing cooling air to the vehicle's passenger compartment comprising:
   a. a vaporizer for vaporizing the fuel as it leaves a fuel container of the vehicle;
   b. means for circulating a working fluid in a closed loop through the vaporizer to vaporize the fuel;
   c. a heat exchanger in the circulating means for exchanging heat energy between the working fluid and air to cool the passenger compartment of the vehicle;
   d. pump means of the circulating means to circulate the working fluid;
   e. thermostatic means in temperature communication with the working fluid outlet of the vaporizer;
   f. normally closed valve means in fluid circuit with the circulating means for admitting warm water from the vehicle's cooling system;
   g. means between the thermostatic element and the normally closed valve means to open the valve when the thermostatic element senses a predetermined temperature approaching the freezing temperature of the working fluid; and
   h. means to discharge working fluid from the circulating means when the normally closed valve means is open an amount corresponding to the amount of water admitted to the circulating means by the valve means.

6. The system claimed in claim 5 wherein:
   a. check valve means is provided in the circulating means between the working fluid outlet of the vaporizer and the working fluid inlet of the heat exchanger to prevent fluid flow in the direction of the working fluid outlet of the vaporizer;

b. recirculating means is included as the discharge means, the recirculating means being between the check valve and the working fluid outlet of the vaporizer for returning working fluid to the cooling system of the engine; and c. heat exchanger valve means is included for admitting warm water from the engine's cooling system to the inlet of the heat exchanger, the check valve being disposed to direct water passing through the heat exchanger valve means directly into the inlet of the heat exchanger.

* * * * *